Patented Oct. 30, 1951

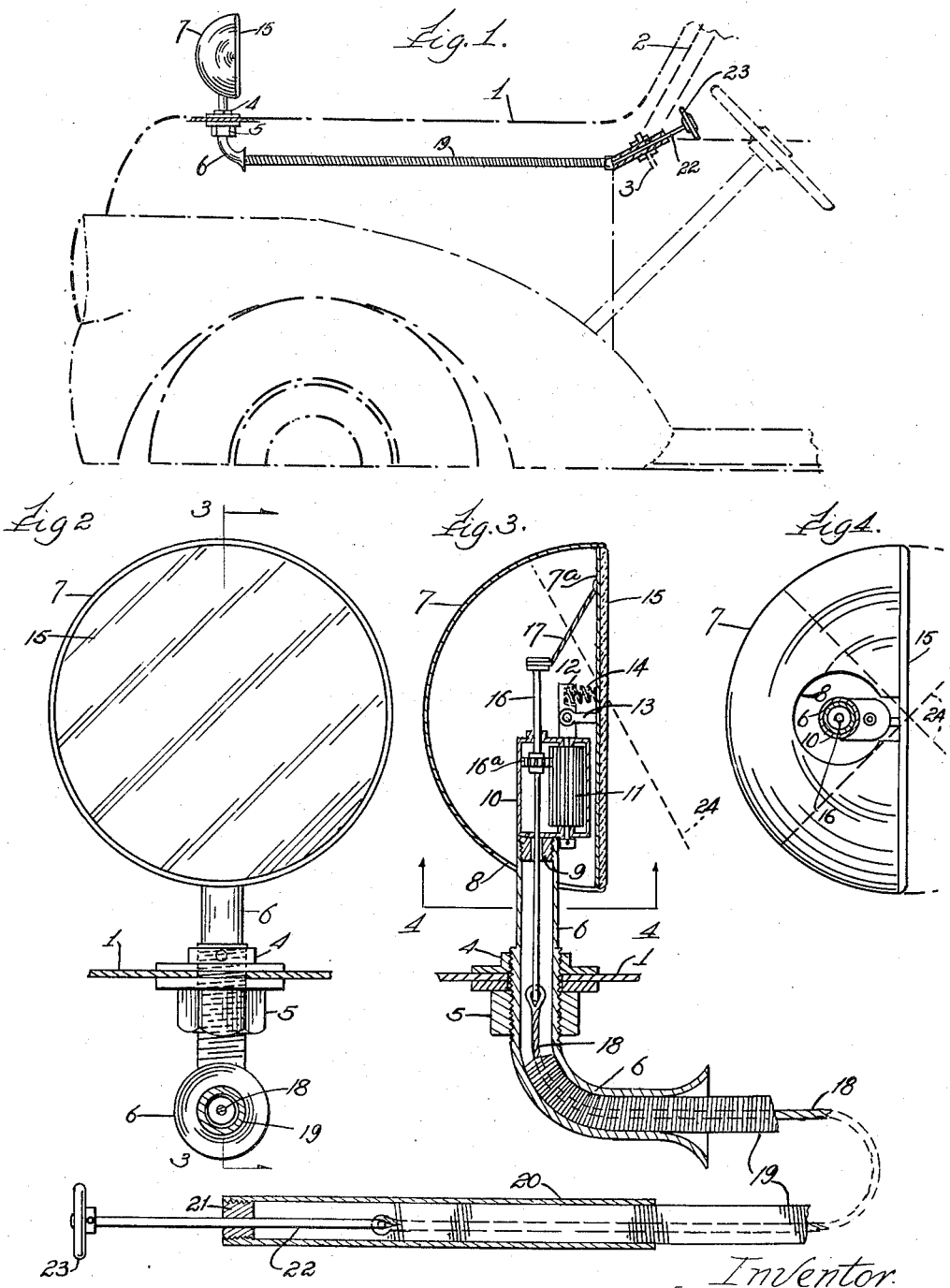

2,573,127

UNITED STATES PATENT OFFICE 2,573,127

VISUAL INDICATING DEVICE FOR VEHICLES

Hans D. von Bredow, Hartland, Wis.

Application March 6, 1950, Serial No. 147,895

1 Claim. (Cl. 88—93)

This invention relates to visual indicating devices for use particularly with automobiles or other related types of vehicles. One object is to provide such a device located at the extreme forward end of the hood of the vehicle in the line of vision of the driver and adjustable by him from his customary position in a manner to disclose to him an approaching vehicle upon a crossroad before it ordinarily would come within his range of vision; or at a relatively remote position from the point of road intersection.

A further object is to provide such an indicating device that is easy of installation, positive and efficient in operation, of few parts and therefore inexpensive to manufacture.

Further objects and numerous advantages following therefrom will become apparent from the following specification taken in connection with the accompanying drawing, wherein—

Fig. 1 portrays in schematic manner a view in elevation of the device as installed upon a motor vehicle.

Fig. 2 is a vertical sectional view, enlarged, through Fig. 1 affording a full face view of the mirror employed.

Fig. 3 is a central vertical sectional view through Fig. 2 substantially on the line 3—3, and, Fig. 4 is a cross-sectional view through Fig. 3 on the line 4—4.

Referring to the drawing the reference numeral 1 denotes the hood, 2 the windshield and 3 the dash of a motor vehicle. Secured to the wall of the front end of the hood as by nuts 4, 5 and extending above and into the interior of the hood is the somewhat L-shaped tube 6, the inner lower end of the tube being open and flared. The upper end of tube 6 extends into the approximately hemispherical housing 7 through a large perforation 8 therein, this tube end being threaded interiorly and receiving a nut 9 depending from and fast to the base or lower end of the casing 10 disposed upon said tube within the housing 7, said casing operatively carrying a cylindrical gear 11 having its shaft journaled in the top and base walls of the casing, the upper end of said shaft integral with a bracket 12 extending above the casing and pivotally connected to a stud 13 secured to a wall 7a of the housing 7, said bracket also connected by contractile coil spring 14 to the housing wall 7a, said wall carrying and completely covered upon its outer face by a mirror 15.

Extending through the casing 10 and therebeyond and into the tube 6 and also above the casing into the housing 7 is the headed rod 16 having fast thereon the pinion 16a in mesh with gear 11, said rod movable longitudinally of said casing, said rod at its upper or head end connected by a flexible cord 17 to the housing wall 7a. The lower end of rod 16 within the tube 6 is preferably eye-shaped and connected to the similarly shaped terminal of a cable 18 that extends through the conduit 19 one end of which is snugly and frictionally received in said tube, the conduit extending rearwardly of the hood and into a tube 20 that extends through a wall or partition of the vehicle and through the dash 3, said tube at its inner end closed by the nut 21 through which the link 22 extends that at its inner end is connected to the cable 18, said link being adjustable axially and at its outer end provided with a handle 23 for rotation or axial movement of the link and connections.

The handle 23 is within easy reach of the driver of the vehicle and the housing 7 so supported that its wall 7a with the mirror 15 are disposed in vertical position and directly facing the driver and in his direct line of vision. As the vehicle approaches a crossroad another vehicle or other object upon the crossroad at each side of the crossroad is reflected in the mirror and visible to the driver while his vehicle is still a material distance from the road intersection. To scan the vicinity of the road intersection the driver may either rotate the handle 23 to cause slow rotation of the mirror or move the handle and link axially to cause the mirror to move vertically into the position denoted by the dotted line 24, Fig. 3. The spring 14 will return the housing to normal position when the handle is released.

What is claimed is:

In visual indicating devices for the hoods of automobiles, a substantially L-shaped tube adjustably secured to and extending through the top of the hood and thereabove, a housing having a large perforation receiving the upper end of said tube, a casing fast to the top of said tube within said housing, a cylindrical gear having a shaft journaled in the casing walls, a bracket fast to said shaft, a stud carried by one housing wall pivotally engaging said bracket, a spring connecting said bracket and said one housing wall, said one housing wall disposed at all times in direct line of vision of the automobile driver, a mirror arranged upon the outer face of said one housing wall, a rotary and longitudinally adjustable rod extending through and beyond said casing into said tubular member and into said housing, a cord connecting said rod and said one housing wall, a pinion fast upon said rod in mesh with said cylindrical gear, a tube extending through a wall of the automobile, and manually operable means engaging said rod for rotating and exerting a pull thereupon to adjust said housing, said means extending through said tube and into the automobile front compartment.

HANS D. v. BREDOW.

REFERENCES CITED

The following references are of record in the file of this patent:

UNITED STATES PATENTS

| Number | Name | Date |
|---|---|---|
| 137,383 | Olander et al. | Apr. 1, 1873 |
| 1,592,449 | Duffy | July 13, 1926 |
| 2,341,208 | Clark et al. | Feb. 8, 1944 |
| 2,472,438 | Price | June 7, 1949 |